(12) United States Patent
Lee

(10) Patent No.: US 12,384,235 B1
(45) Date of Patent: Aug. 12, 2025

(54) SYSTEM AND METHOD FOR INTERCHANGING POWER SUPPLIES ASSOCIATED WITH A VEHICLE UTILIZING A MODULAR CHASSIS

(71) Applicant: Alpha Motor Corporation, Irvine, CA (US)

(72) Inventor: Edward Y Lee, Irvine, CA (US)

(73) Assignee: Alpha Motor Corporation, Irvine, CA (US)

( * ) Notice: Subject to any disclaimer, the term of this patent is extended or adjusted under 35 U.S.C. 154(b) by 0 days.

(21) Appl. No.: 18/762,339

(22) Filed: Jul. 2, 2024

Related U.S. Application Data

(63) Continuation-in-part of application No. 18/607,848, filed on Mar. 18, 2024, which is a continuation-in-part of application No. 18/457,889, filed on Aug. 29, 2023, now Pat. No. 11,970,229, which is a continuation-in-part of application No. 18/163,004, filed on Feb. 1, 2023, now abandoned, which is a continuation of application No. 29/838,840, filed on May 16, 2022, now Pat. No. Des.
(Continued)

(51) Int. Cl.
*B60K 1/04* (2019.01)

(52) U.S. Cl.
CPC ........ *B60K 1/04* (2013.01); *B60K 2001/0455* (2013.01)

(58) Field of Classification Search
CPC ................... B60K 1/04; B60K 2001/0455
See application file for complete search history.

(56) References Cited

U.S. PATENT DOCUMENTS

| 2019/0210651 A1 * | 7/2019 | Svacha | B62D 33/077 |
| 2020/0139802 A1 * | 5/2020 | Nagasaka | B60K 17/356 |

(Continued)

FOREIGN PATENT DOCUMENTS

| AU | 2007234883 A1 * | 10/2008 | B60G 11/15 |
| CN | 100402360 C * | 7/2008 | B60G 13/14 |

(Continued)

OTHER PUBLICATIONS

Vitale et al. CN 100402360, Machine English Translation, ip.com (Year: 2008).*

(Continued)

*Primary Examiner* — Karen Beck
(74) *Attorney, Agent, or Firm* — AVEK IP, LLC

(57) ABSTRACT

A system and method of interchanging power supplies associated with a vehicle include a first chassis having a front portion, a rear portion, a first center portion, a first front transition portion disposed between the front portion and the first center portion, and a first rear transition portion disposed between the first center portion and the rear portion, the first center portion forming a first power supply compartment, and mounting fixtures supported by at least one of the portions, the mounting fixtures to receive vehicle body components. A first power supply is secured to the first center portion as the vehicle is assembled. The vehicle is disassembled, and the first center portion is replaced with a second center portion, the first front and rear transition portions are replaced with second front and rear transition portions, and the vehicle is reassembled with a second power supply.

18 Claims, 15 Drawing Sheets

Related U.S. Application Data 1,042,226, and a continuation of application No. 29/781,864, filed on Apr. 30, 2021, now Pat. No. Des. 1,014,330.

(56) References Cited

U.S. PATENT DOCUMENTS

| | | | |
|---|---|---|---|
| 2022/0135133 A1* | 5/2022 | Cai | B60K 1/04 |
| | | | 296/26.01 |
| 2022/0348260 A1* | 11/2022 | Harmon | B62D 27/00 |

FOREIGN PATENT DOCUMENTS

| | | | | |
|---|---|---|---|---|
| CN | 115042866 A | * | 9/2022 | B60K 1/04 |
| CN | 115042866 B | * | 8/2024 | B60K 1/04 |
| DE | 102019104767 A1 | * | 8/2020 | |
| WO | WO-2007118082 A2 | * | 10/2007 | B60G 11/15 |

OTHER PUBLICATIONS

Waldemar et al. CN115042866, Machine English Translation, ip.com (Year: 2024).*

* cited by examiner

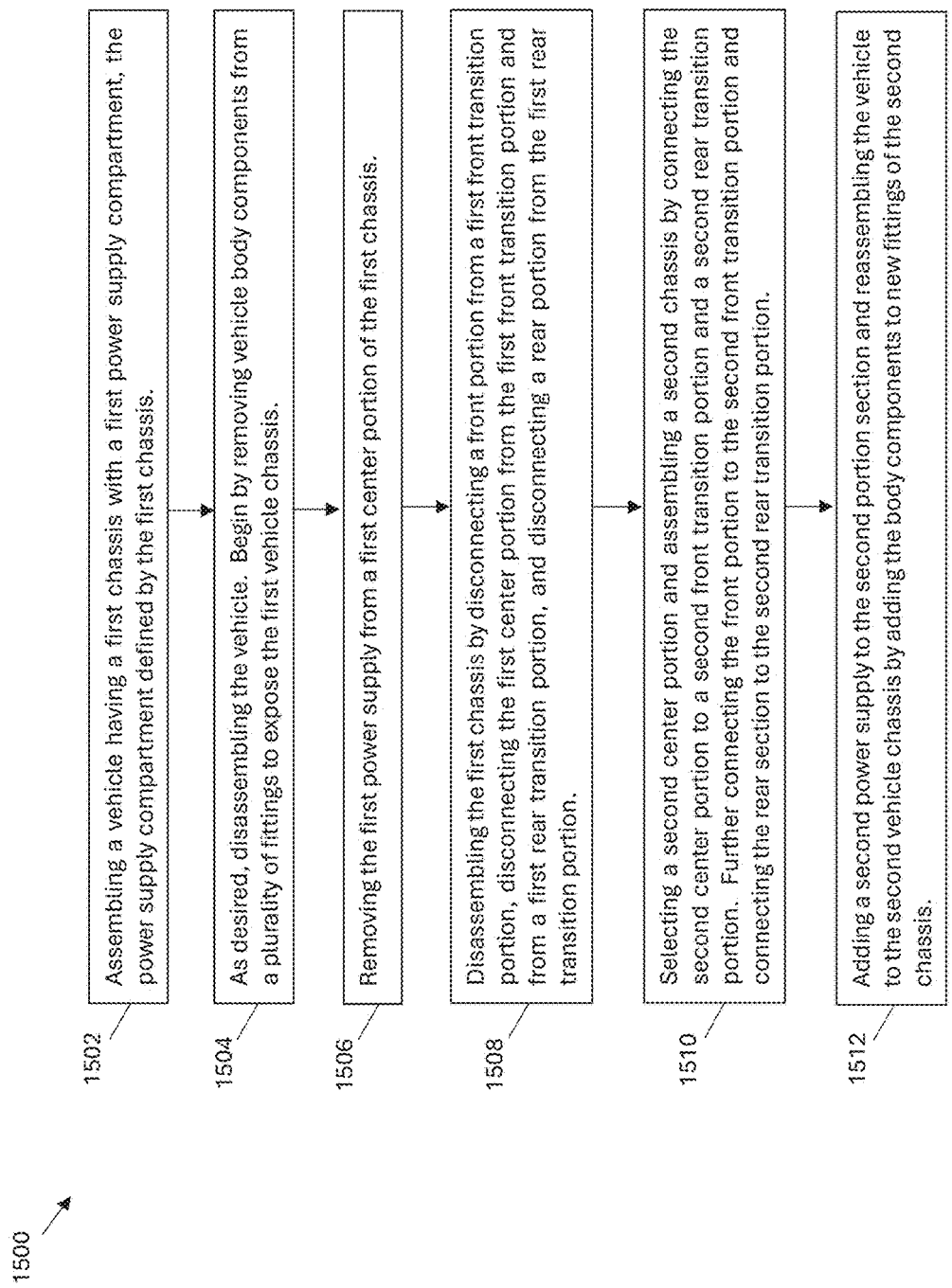

SYSTEM AND METHOD FOR INTERCHANGING POWER SUPPLIES ASSOCIATED WITH A VEHICLE UTILIZING A MODULAR CHASSIS

RELATED APPLICATIONS

This application is a continuation in part of U.S. Application No. 18,607,848 filed Mar. 18, 2024, which is a continuation in part of U.S. Application No. 18,457,889, filed Aug. 29, 2023, which is a continuation in part of U.S. application Ser. No. 18/163,004, filed Feb. 1, 2023, which is a continuation in part of U.S. application Ser. No. 29/838,840, filed May 16, 2022, and U.S. application Ser. No. 29/781,864 filed Apr. 30, 2021. All of the foregoing are incorporated by reference in their entireties herein.

FIELD OF THE INVENTION

The disclosure relates generally to the field of electric vehicles. More specifically, the disclosure relates to a system and method of interchanging power supplies of a vehicle utilizing a modular chassis.

BACKGROUND OF THE INVENTION

Electric vehicles are generally known in the art, as are vehicles comprised of a power supply, a propulsion system, a chassis or frame, and a body. An example of one such vehicle is disclosed in U.S. Pat. No. 11,505,265 to Lee, the disclosure of which is incorporated herein, in its entirety, by reference. Lee discloses a multipurpose vehicle system having modular components which may be interchanged by a user for a particular application. Typically, electric vehicles use electrical energy as a source of power as an alternative to traditional fossil fuels. The vehicles are propelled by one or more electric motors, which are connected to a power supply such as a rechargeable battery or battery system. These electric vehicles are equipped with high-capacity batteries which enable the vehicles to travel considerable distance between recharging. These batteries, be it during routine maintenance or for a complete replacement, may need to be removed from the vehicle periodically, which may be a tedious and/or difficult task. It is advantageous, therefore, for an electric vehicle, and in particular the vehicle chassis, to facilitate removal and instillation of the rechargeable battery. In addition, it may be desirable for a vehicle to support either a smaller capacity battery or a larger capacity battery, and accordingly, it is desirable, and a benefit of the present invention, to provide for interchangeable center portions of a chassis, such that the vehicle can be disassembled and reassembled with an alternate center portion, thereby being adaptable to support either a smaller or larger battery depending on the needs and preferences of the operator. In embodiments, the vehicle body components and front and rear portions remain unchanged, wherein just a center portion is interchanged, and accordingly, the system and method of interchanging a power supply improves efficiency.

In addition to rechargeable batteries, electric vehicles may utilize a hydrogen fuel cell as a power source. However, existing solutions do not allow for simple conversion from one power source type (e.g., a hydrogen fuel cell) to another power source type (e.g., a rechargeable battery system) without extensive modifications to the existing vehicle chassis, which may prove time-consuming and expensive, or without the need for a completely different chassis altogether. It therefore may be desirable for a vehicle chassis to accommodate and facilitate timely component changes, as well as being suitable for a wide variety of power supplies and/or other features.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to an embodiment, the present invention relates to a method of interchanging power supplies associated with a vehicle. Initially, a first chassis is assembled, the first chassis having a front portion, a rear portion, a first center portion, a first front transition portion disposed between the front portion and the first center portion, and a first rear transition portion disposed between the first center portion and the rear portion. The first center portion includes a pair of longitudinal supports extending between the first front transition portion and the first rear transition portion, the first center portion forms a first power supply compartment having a first dimensional width between the pair of longitudinal supports sized for a first power supply. The first chassis further includes a plurality of mounting fixtures supported by one or more of the front portion, the first front transition portion, the first center portion, the first rear transition portion, and the rear portion. Next in the method, the vehicle is assembled with the first chassis. Assembly of the vehicle includes securing the first power supply to the first center portion and securing a plurality of vehicle body components to the plurality of mounting fixtures. Then in the method, as desired by an operator, the first power supply is interchanged with a second power supply. Interchanging the power supplies includes disassembling the vehicle by removing the plurality of vehicle body components from the plurality of mounting fixtures to expose the first chassis and the first power supply, removing the first power supply, disconnecting the front portion from the first front transition portion, disconnecting the first center portion from the first front transition portion and the first rear transition portion, and disconnecting the rear portion from the first rear transition portion. Interchanging the power supplies further includes selecting a second center portion appropriate for the second power supply, a second front transition portion associated with the second center portion, and a second rear transition portion associated with the second center portion. Then, assembling a second chassis by connecting the front portion to the second front transition portion, connecting the second center portion to the second front transition portion and the second rear transition portion, and connecting the rear portion to the second rear transition portion. Finally, interchanging the power supplies also includes installing the second power supply onto the second center portion, wherein the second center portion has a second dimensional width that is different from the first dimensional width such that the first center portion and the second center portion support different power supplies. Finally in the method, the vehicle is reassembled by installing the plurality of vehicle body components onto a second plurality of mounting fixtures of the second chassis.

According to another embodiment, the present invention relates to a system for interchanging power supplies associated with a vehicle. The system includes a first chassis, the first chassis having a front portion, a rear portion, a first center portion, a first front transition portion disposed between the front portion and the first center portion, and a first rear transition portion disposed between the first center portion and the rear portion. The first center portion has a pair of longitudinal supports extending between the first front transition portion and the first rear transition portion, the first center portion forms a first power supply compartment having a first dimensional width between the pair of longitudinal supports sized for a first power supply, The first chassis further having a plurality of mounting fixtures supported by one or more of the front portion, the first front transition portion, the first center portion, the first rear transition portion, and the rear portion, the plurality of mounting fixtures configured to receive a plurality of vehicle body components to render the vehicle. The front portion can disconnect from the first front transition portion via a first set of mating brackets, the first center portion can disconnect from the first front transition portion via a second set of mating brackets and from the first rear transition portion via a third set of mating brackets, and the rear portion can disconnect from the first rear transition portion via a fourth set of mating brackets. The first power supply is configured to removably secure within the first power supply compartment. The system also includes a second center portion having a second power supply compartment with a second dimensional width appropriate for a second power supply, a second front transition portion associated with the second center portion, and a second rear transition portion associated with the second center portion. A second chassis includes the front portion connected to the second front transition portion, the second center portion connected to the second front transition portion and the second rear transition portion, and the rear portion connected to the second rear transition portion. The second power supply is configured to removably secure within the second power supply compartment. The first center portion can be interchanged with the second center portion such that the first power supply can be interchanged with the second power supply; and the second center portion has a second dimensional width that is different from the first dimensional width such that the first center portion and the second center portion support different power supplies.

BRIEF DESCRIPTION OF THE DRAWINGS

Illustrative embodiments of the present disclosure are described in detail below with reference to the attached drawing figures.

FIG. 15 is a flowchart of a method of interchanging power supplies using the first vehicle chassis and the second vehicle chassis.

LIST OF REFERENCES

Figure 1:
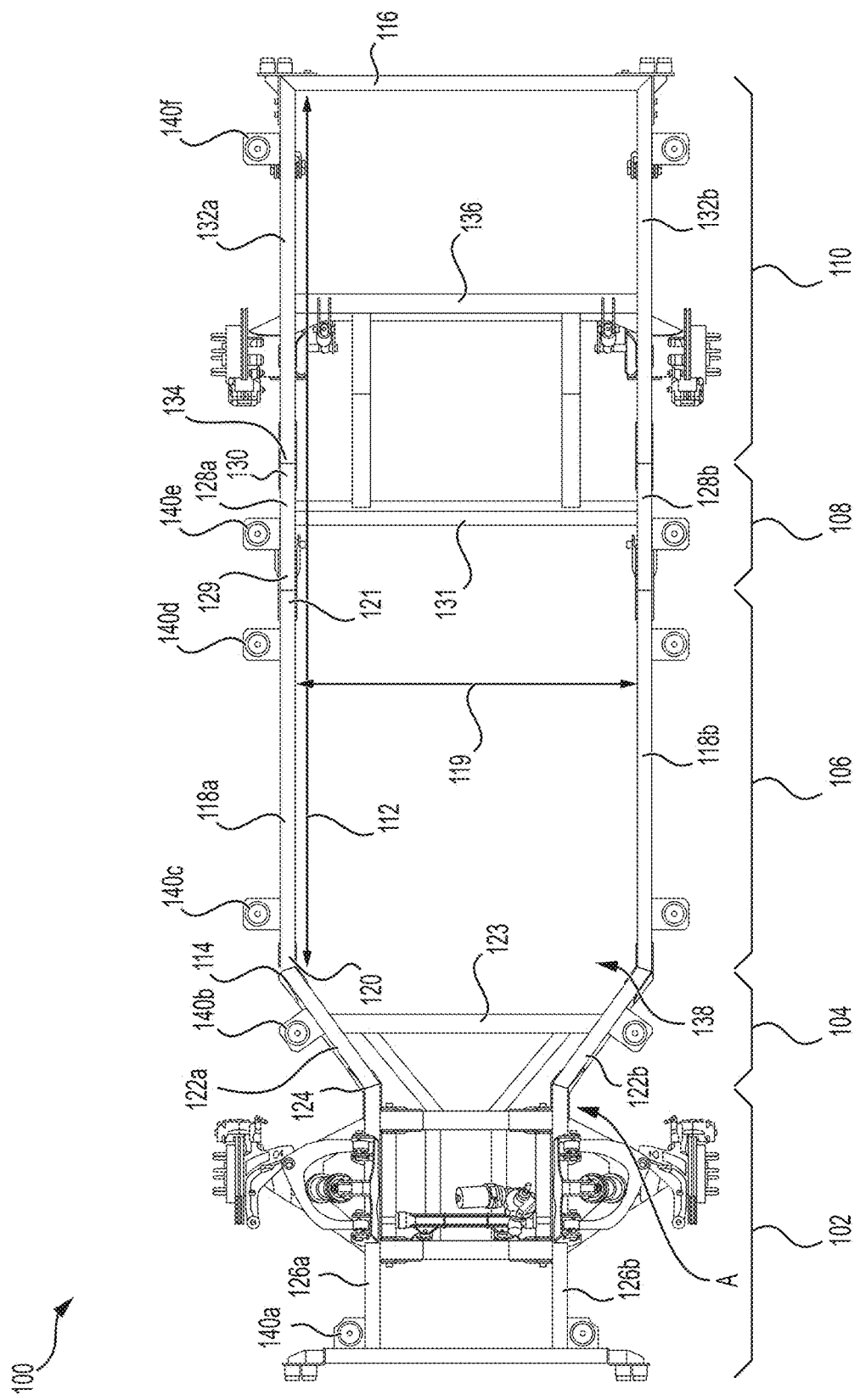
FIG. 1 is a top view of a first vehicle chassis as part of a vehicle having an interchangeable power supply in accordance with the present invention.

100—First Vehicle Chassis
102—Front Portion
104—First Front Transition Portion
106—First Center Portion
108—First Rear Transition Portion
110—Rear Portion
112—Arrow
114—Rear End of the First Front Transition Portion
116—Rear End of the Rear Portion
118a-b—Parallel Longitudinal Supports
119—First Distance Between Parallel Longitudinal Supports
120—Front End of the Center Portion
121—Rear End of the Center Portion
122a-b—Outwardly Angled Supports
123—Cross Bar
124—Front End of the First Front Transition Portion
126a—b—Front Portion Longitudinal Supports
128a-b—Rear Transition Portion Parallel Longitudinal Supports
129—Front End of the First Rear Transition Portion
130—Rear End of the First Rear Transition Portion
131—Cross Member
132a-b—Rear Portion Longitudinal Supports
134—Front End of the Rear Portion
136—Rear Portion Cross Member
138—First Power Supply Compartment
140a-f—Mounting Fixtures
300—Second Vehicle Chassis
302—Second Front Transition Portion
304—Second Center Portion
306—Second Rear Transition Portion
308a-b—Parallel Longitudinal Supports
310a-b—Cross Members
312—Central Longitudinal Member
314—Second Distance Between Parallel Longitudinal Supports
316—Front End of the Center Portion
318—Rear End of the Center Portion
320a-b—Outwardly Angled Supports
322—Crossbar 324—Front End of the Front Transition Portion
326—Rear End of the Front Transition Portion
328a-b—Angled Supports
330—Front End of the Second Rear Transition Portion
332—Rear End of the Second Rear Transition Portion
334—Cross Member
336a-c—Mounting Fixtures
338—Power Supply Compartment
500—Front Grille Receiver
502a-b—Side Adapters
504a-b—Receivers
506a-b—Downwardly-angled Supports
700—First Power Supply
800—Second Power Supply
900a-d—Connection Brackets
902—Selected Front Transition Portion
904—Selected Center Portion
906—Selected Rear Transition Portion
1100—Base Mounting Plate
1102—Fitting
1200—Front Suspension Mounting Assembly
1202—Suspension Mounting Frame
1204—Lower Parallel Longitudinal Supports
1206—Angular Offset Supports
1208a-c—Front Suspension Mounting Brackets
1210a-b—Upper Control Arm Mounting Pins
1300—Lower Parallel Lateral Supports
1302—Angular Support
1304a-b—Pair of Lower Control Arm Mounts
1400—Upper Control Arm
1402—Shock Absorber
1404—Lower Control Arm
1406—Brake Assembly
1500—Flow Chart with steps 1502, 1504, 1506, 1508, 1510, 1512

DETAILED DESCRIPTION

The following detailed description intended to be exemplary in nature and is not intended to limit the described embodiments or the application and uses of the described embodiments. As used herein, the words "exemplary" and "illustrative" mean "serving as an example, instance, or illustration." Any embodiment described herein as "exemplary" or "illustrative" is not necessarily to be construed as preferred or advantageous over other embodiments either inherent or expressly described herein. The embodiments described below are exemplary embodiments provided to enable a skilled artisan to make or use the embodiments of the disclosure and are not intended to limit the scope of the disclosure, which is defined by the claims.

For purposes of description herein, the terms "upper," "lower," "left," "rear," "right," "front," "vertical," "horizontal," and derivatives thereof shall relate to the invention as oriented in FIG. 1, unless otherwise stated. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Vehicles are well known in the art and vary in dimensions, vehicle body components, power supplies, and many other components. The diversity among vehicle makes and models requires extensive engineering and design solutions for each vehicle. Specifically, each vehicle model is generally designed with independent components, such that each component is engineered for that specific vehicle. Accordingly, the ability to interchange components between vehicles is almost non-existent in the industry. Electric vehicles generally use a battery supply to power the necessary components of the vehicle, for example, one or more batteries are generally installed into one or more locations of the vehicle to power the vehicle. Usually, electric vehicles are designed with a specific power supply in mind as part of the vehicle, specifically, a certain battery is installed during manufacturing of the vehicle, and therefore the vehicle is limited to the certain battery.

The present invention provides for a method and system for interchanging power supplies of a vehicle utilizing a modular vehicle chassis. Specifically, the modular chassis has a plurality of portions, which are each independently able to disconnect from other portions, allowing for a single portion to be easily removed and replaced with a new portion. The system and method specifically utilize a plurality of center portions, such that each center portion is appropriate for a specific power supply. This allows for a user, manufacturer, or other personnel to select a center portion and interchange out the center portion to accommodate a different power supply. In embodiments discussed herein, a center portion of the modular chassis can be changed out, which allows for a power supply compartment to be interchanged. This feature allows for the chassis to be modified easily such that different power supplies can be utilized for the same vehicle. In embodiments, the vehicle body components are removed, the center portion changed out, and the vehicle body components added back such that the same vehicle is rebuilt with a new power supply. Alternatively, different vehicle body components could be utilized to render a new vehicle.

Figure 2:
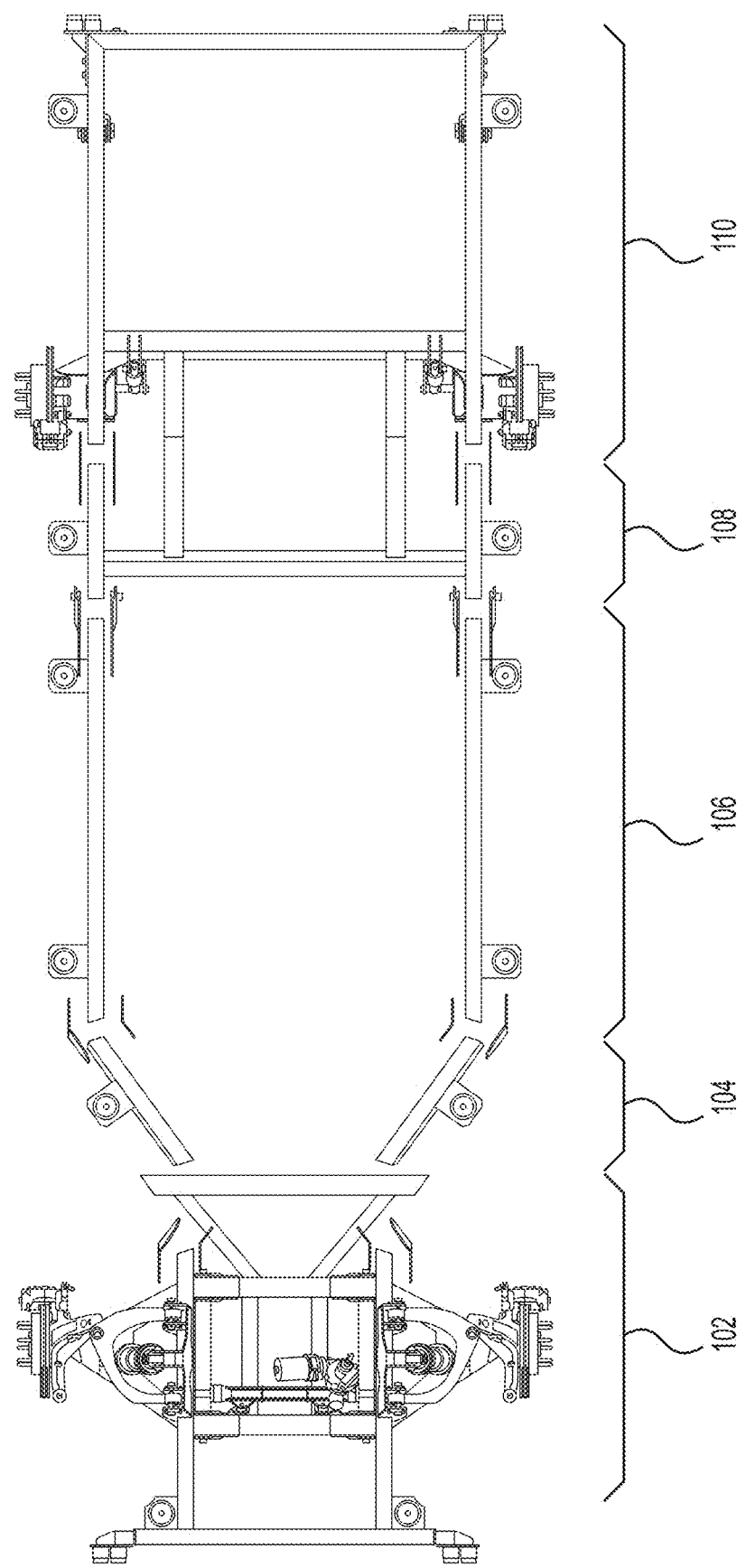
FIG. 2 is a top view of the first vehicle chassis of FIG. 1 with chassis portions separated.
Figure 3:
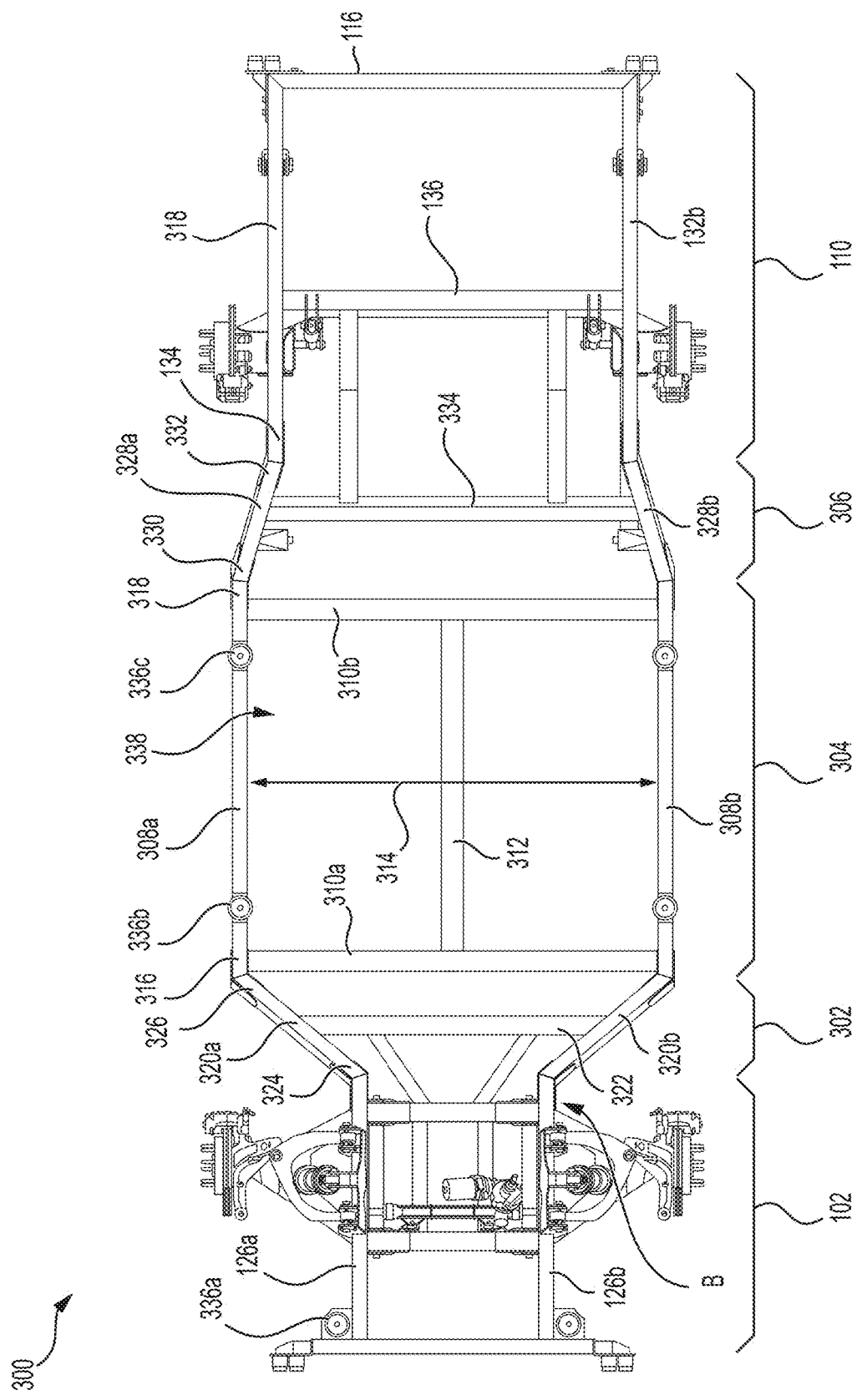
FIG. 3 is a top view of a second vehicle chassis as part of the vehicle having an interchangeable power supply in accordance with the present invention.
Figure 4:
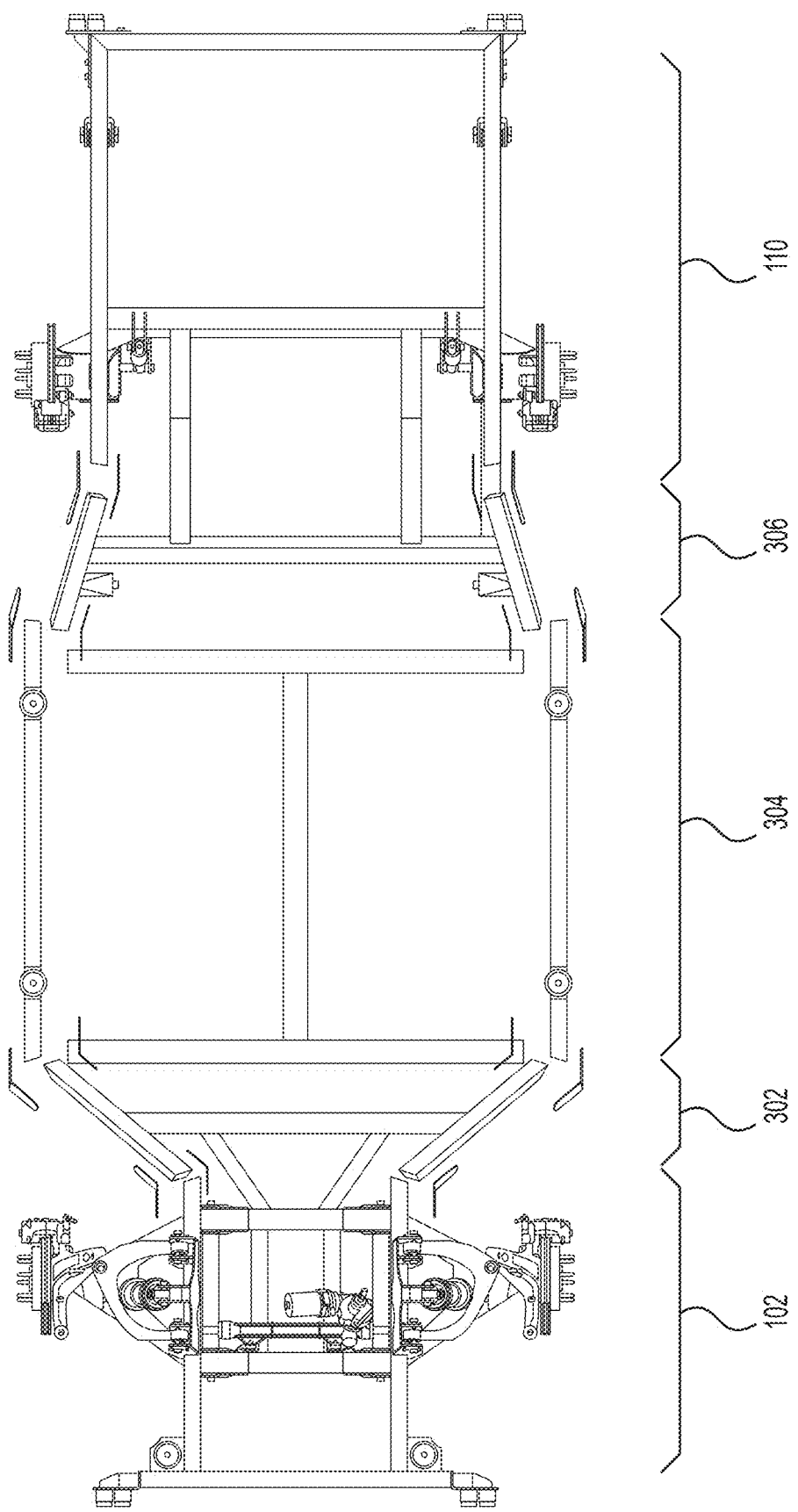
FIG. 4 is a top view of the second vehicle chassis of FIG. 3 with the chassis portions separated.

FIGS. 1 and 2 depict a first vehicle chassis 100 and FIGS. 3 and 4 depict a second vehicle chassis 300. In other words, the first vehicle chassis 100 can be transformed into the second vehicle chassis 300 due to the modularity. These chassis, in combination, create the modular chassis as the core of the present invention. In other words, although each chassis is referred to independently here, the overall modular chassis is the combination of the two, where the components can be interchanged such that the overall resulting chassis of the vehicle is modified.

The first chassis 100 includes a front portion 102 connected to a first front transition portion 104 and a center portion 106 connected to the first front transition portion 104 and also connected to a first rear transition portion 108. Finally, a rear portion 110 is connected to the first rear transition portion 108. As shown with arrow 112, the first chassis 100 is straight from a rear end 114 of the front transition portion 104 to a rear end 116 of the rear portion 110. In other words, the chassis 100 has a single dimensional width for this entire distance.

The center portion 106 includes a pair of parallel longitudinal supports 118a-b extending from a front end 120 of the center portion 106 to a rear end 121 of the center portion 106. A first distance 119 between the parallel longitudinal supports 118a-b defines a first power supply compartment 138.

The first front transition section 104 is defined by a pair of outwardly angled supports 122a-b and a cross bar 123 extending therebetween. The outwardly angled supports 122*a-b* extend from a front end 124 of the first front transition portion 104 to the rear end 114 of the first front transition portion 104. The rear end 114 of the first front transition 104 is connected to the front end 120 of the center portion 106 in such a manner that allows for the first front transition portion 104 to disconnected easily from the center portion 106. Similarly, all portions that make up the chassis 100 can be easily disconnected for modularity.

The front portion 102 is defined by a pair of front portion longitudinal supports 126*a-b*. In examples shown herein, the front portion 102 and the rear portion 110 remain consistent throughout the modularity of the chassis. In other words, the center portion, front transition portion, and rear transition portion can all be interchanged, while the front portion 102 and rear portion 110 remain consistent. This allows for not all of the chassis to require changing out or modification, but rather just portions.

The front portion longitudinal supports 126*a-b* connect to the outwardly angled supports 122*a-b* via any means that again allows for easy disconnection, such as mating brackets as discussed below. The supports 126*a-b* connect to the outwardly angled supports 122*a-b* at a first angle A. The first front transition portion 104 is designed such that the front portion 102 and the first center portion 106 are appropriately connected. In other words, depending on the first distance 119, the first front transition portion 104 must be appropriately selected to connect the first center portion 106 to the front portion 102.

The first rear transition portion 108 similarly is selected based on the dimensions of the first center portion 106 as needed to connect to the rear portion 110. Here, in the example shown in FIG. 1, the first rear transition portion 108 includes a pair of rear transition portion parallel longitudinal supports 128*a-b*. As shown, these supports 128*a-b* are parallel and aligned with the center portion 106 longitudinal supports, as well as rear portion longitudinal supports 132*a-b*. Again, this causes a straight assembly as represented with arrow 112.

The supports 128*a-b* extend from a front end 129 of the first rear transition portion to a rear end 130 of the first rear transition portion 108. A cross member 131 extends therebetween. In the embodiment shown, the cross member 131 is perpendicular to the supports 128*a-b*. The rear end 130 connects to a front end 134 of the rear portion longitudinal supports 132*a-b* such as via a mating bracket. Another perpendicular cross member 136 extends between the rear portion longitudinal supports 132*a-b*.

The chassis 100 supports a plurality of mounting fixtures 140*a-f*. These mounting fixtures can vary, however in the embodiment shown, the mounting fixtures 140*a-f* extend outwardly and substantially perpendicular from one or more portions of the chassis. These mounting fixtures 140*a-f* allow for vehicle body components to be mounted thereto easily. In embodiments, the vehicle body components will include corresponding fixtures, such that the vehicle body components will easily mount to the fixtures.

As shown in FIG. 2, the portions 102, 104, 106, 108, 110 can be disconnected from one another, such that portions can be replaced, therefore defining the modularity of the vehicle chassis. As discussed later on, one means of connecting and disconnecting the portions is the use of mating brackets, wherein the brackets are shaped as needed (straight, angled, outwardly/inwardly bent) to secure the portions together.

In FIGS. 3 and 4, a second chassis 300 is shown. Here, the first vehicle chassis 100 is taken, disassembled, and the first center portion 106, first front transition portion 104, and first rear transition portion 108 are all replaced. Those skilled in the art will appreciate that the change can go in reverse as well (i.e. chassis 300 to chassis 100). The front portion 102 and rear portion 110 remain consistent.

The second chassis 300 includes a second front transition portion 302 connected to the front portion 102, a second center portion 304 connected to the second front transition portion 302 and a second rear transition portion 306. The rear portion 110 is reconnected to the second rear transition portion 306. As discussed with the first chassis 100, here again, the second front transition portion 302 and the second rear transition portion 306 are selected based on the selected second center portion 304 such that appropriate connection is made between the second center portion 304 and the front portion 102 and rear portion 110.

The second center portion 304 is similar to the first center portion 106, having a pair of parallel longitudinal supports 308*a-b* extending from a front end 316 to a rear end 318. A pair of cross members 310*a-b* extend between the pair of parallel longitudinal supports 308*a-b* and a central longitudinal member 312 extends between the pair of cross members 310*a-b* approximately midway between the longitudinal supports 308*a-b*. Here, a second distance 314 between the parallel longitudinal supports defines a second power supply compartment 338. The second distance 314 is greater than the first distance 119 and therefore is sized for a second power supply (i.e. a larger battery).

The second front transition portion 302 is defined by a pair of outwardly angled supports 320*a-b* extending from a front end 324 to a rear end 326, the second front transition portion 302 connecting to the front portion 102 and the front end 316 of the second center portion 304. Here, the outwardly angled supports 320*a-b* connect with the pair of longitudinal supports 126*a-b* of the front portion 102 creating a second angle B. Those skilled in the art will clearly appreciate that the first angle A of the first chassis 100 is larger than the second angle B of the second chassis 300. This is due to the second front transition portion 302 being selected specifically as corresponding with the second center portion 304. In other words, due to the front portion 102 being consistent, the second front transition portion 302 must change to create the continuity between the front portion 102 and the second center portion 304. A crossbar 322 extends between the outwardly angled supports 320*a-b*.

Similarly, the second rear transition portion 306 is selected based on the center portion 304 as appropriate to connect the second center portion 304 to the rear portion 110. Here, since the second center portion 304 is wider, the second rear transition portion 306 is now composed of angled supports 328*a-b* that extend from a front end 330 to a rear end 332. Accordingly, these angled supports 328*a-b* taper back down to the width of the rear portion 110. Another cross member 334 extends between the angled supports 328*a-b*.

Again, a plurality of mounting fixtures 336*a-c* are mounted to one or more of the chassis portions. The exact positioning and number of the fixtures may vary, but again provide for adding vehicle components to the chassis. Here, the mounting fixtures 336*a-c* are shown mounted to a top surface of the chassis, as opposed to extending out perpendicular to the chassis. Again, although positioning may vary, in some cases, the distance between the mounting fixtures may remain equal. For example, two corresponding fixtures of the first chassis 100 which extend outward from the chassis, may be spaced apart equally to two corresponding fixtures on the second chassis 300. This would allow for the same body components to be removed and then added back, as the overall arrangement of the fixtures (i.e. distance apart and positioning) remains unchanged, even though the power supply compartment itself changed.

In FIG. 4, the second chassis 300 is shown with the portions disassembled for clarity.

Figure 5:
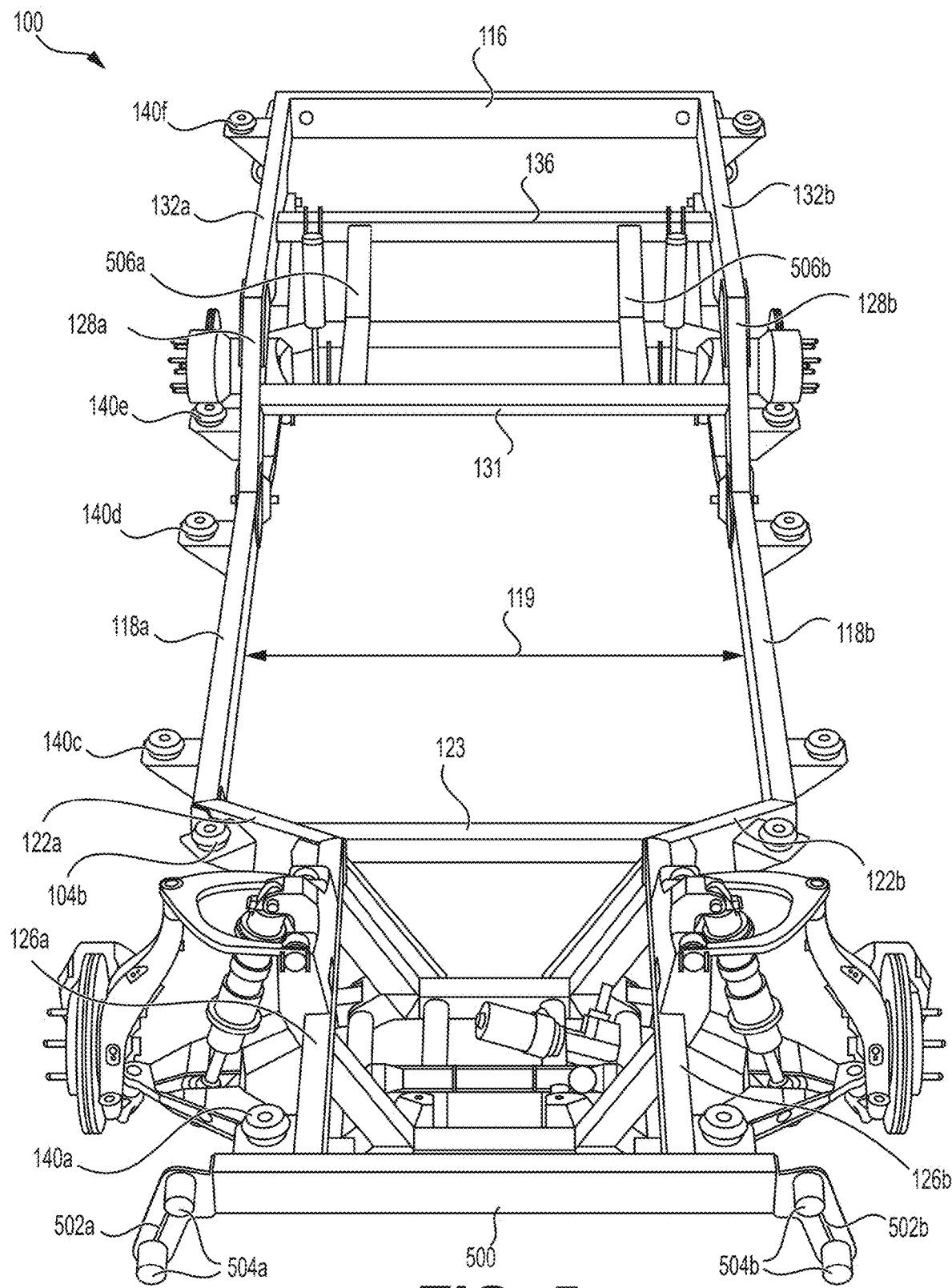
FIG. 5 is a front perspective view of the first vehicle chassis of FIG. 1.
Figure 6:
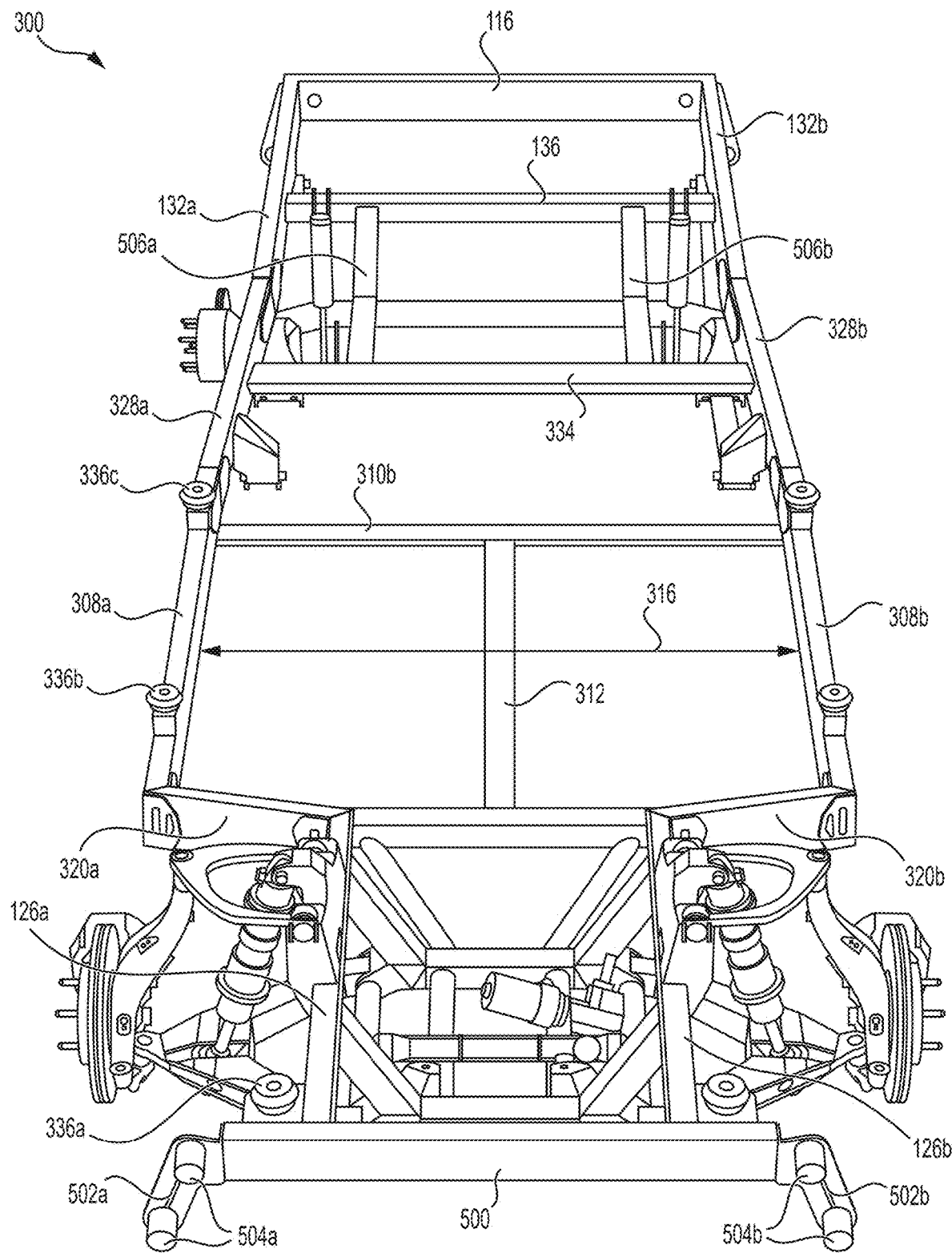
FIG. 6 is a front perspective view of the second vehicle chassis of FIG. 3.

FIG. 5 depicts another view of the first chassis 100 while FIG. 6 depicts another view of the second chassis 300. Again, the differing distances 119, 314 are shown. In addition, the front portion 102 is shown in more detail, having a front grille receiver 500 positioned at the front end, along with side adapters 502a-b, and receivers 504a-b. This configuration allows for a grille assembly to be attached or removed from the associated chassis.

Figure 7:
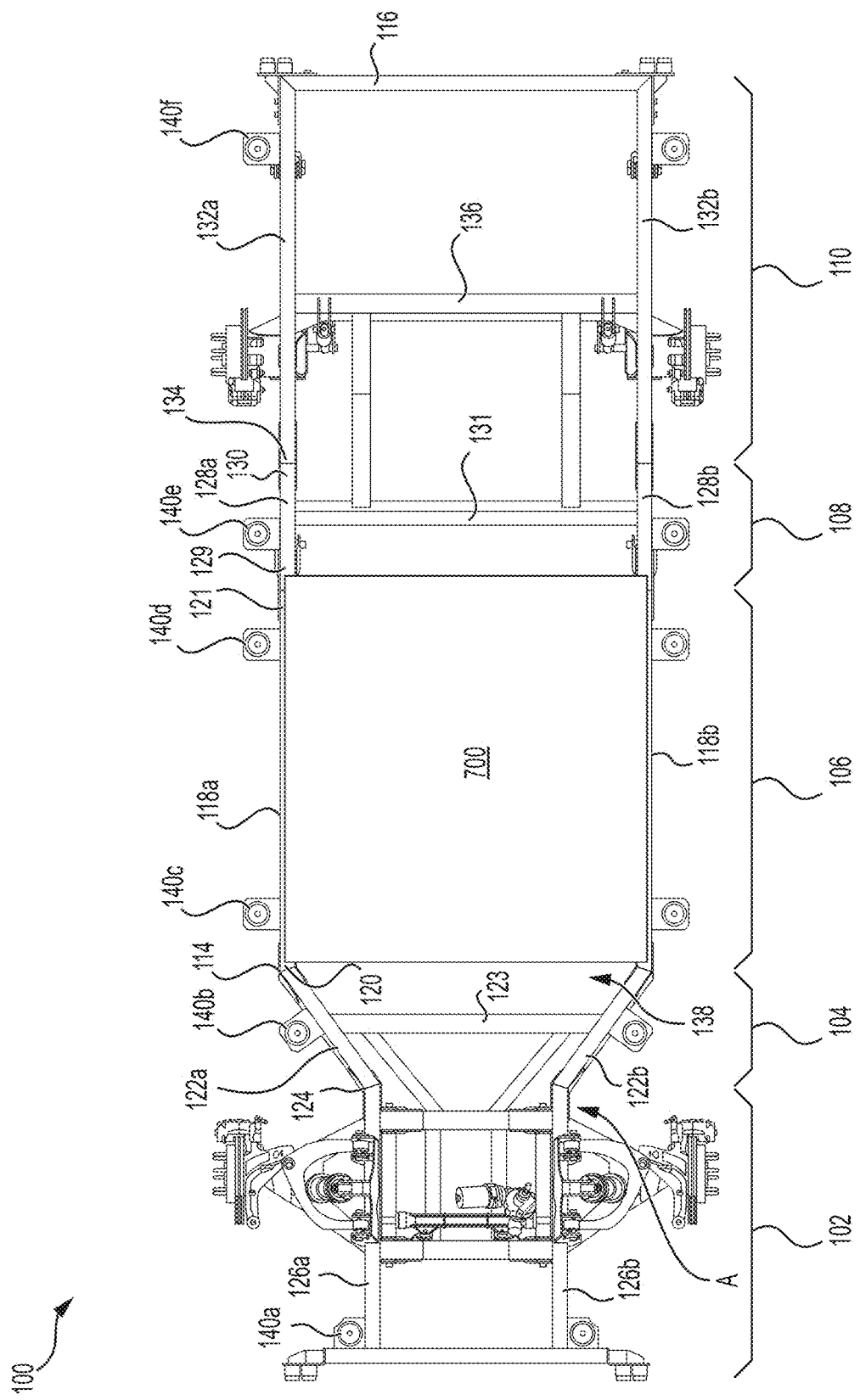
FIG. 7 is a top view of the first vehicle chassis of FIG. 1 with a first power supply as part of the vehicle having the interchangeable power supply.
Figure 8:
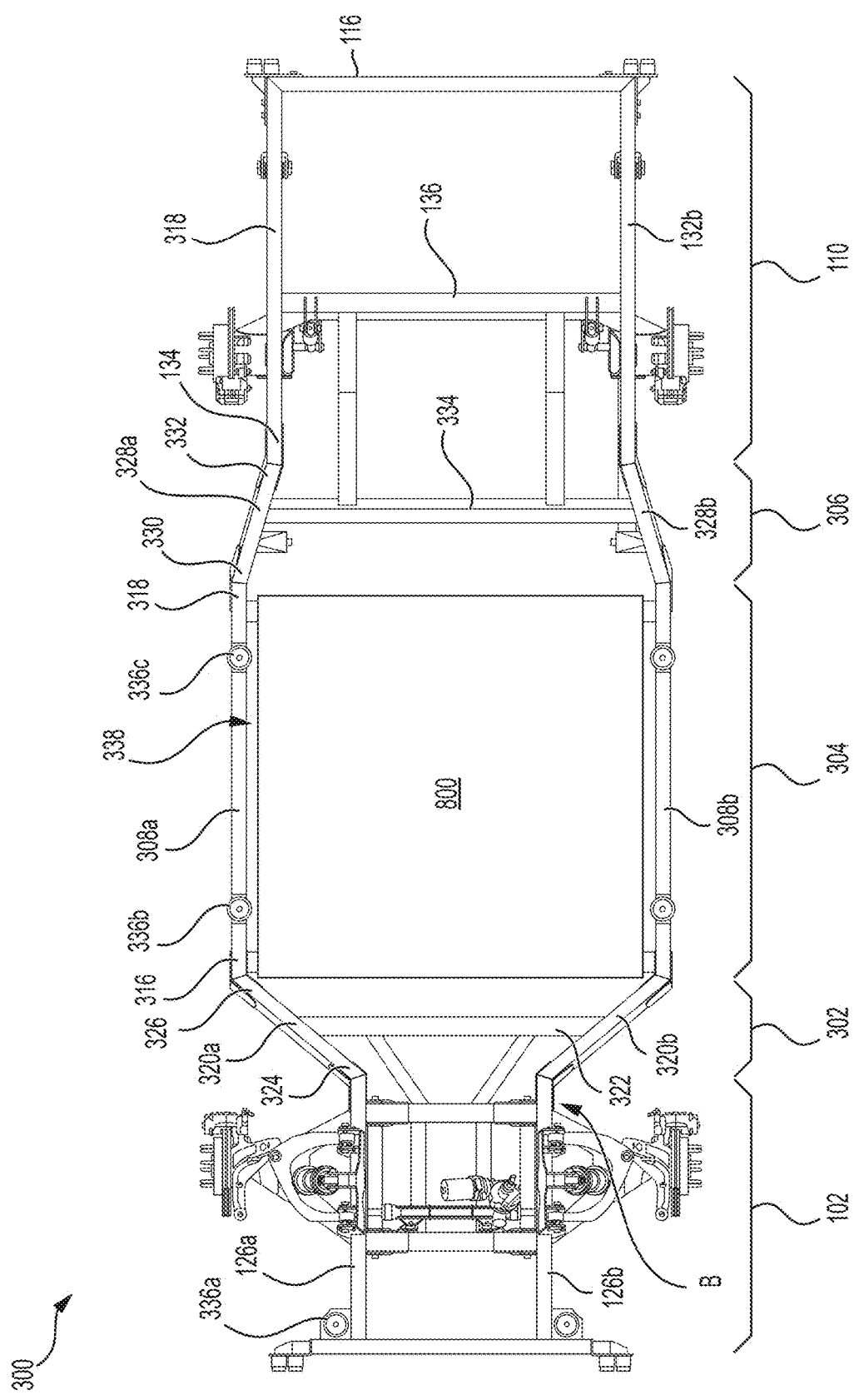
FIG. 8 is a top view of the second vehicle chassis of FIG. 3 with a second power supply as part of the vehicle having an interchangeable power supply.

In FIG. 7, the first chassis 100 is shown, having a first power supply 700 supported by the first center portion 106. In FIG. 8, the second chassis 300 is shown, having a second power supply 800 supported by the second center portion 304. Each power supply may be secured by any means appropriate, and can include various ports, wires, or the like as would be known and understood by those skilled in the art.

Figure 9:
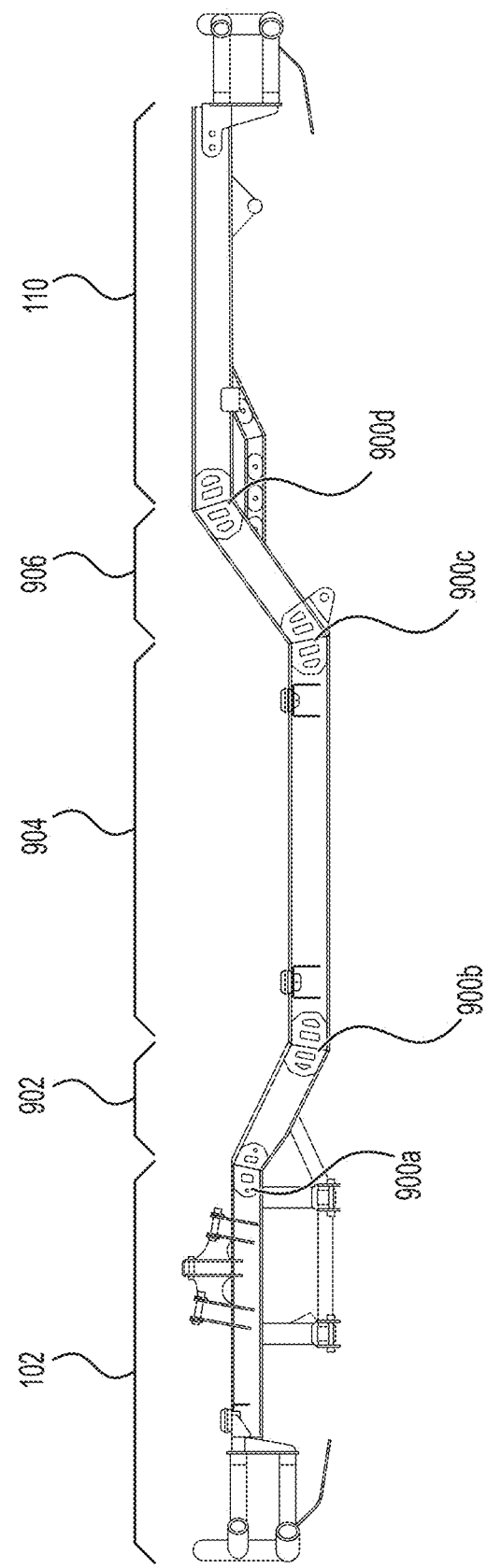
FIG. 9 is a side view of a vehicle chassis, being either of the first vehicle chassis or second vehicle chassis, showing a plurality of mating brackets connecting the chassis portions.
Figure 10:
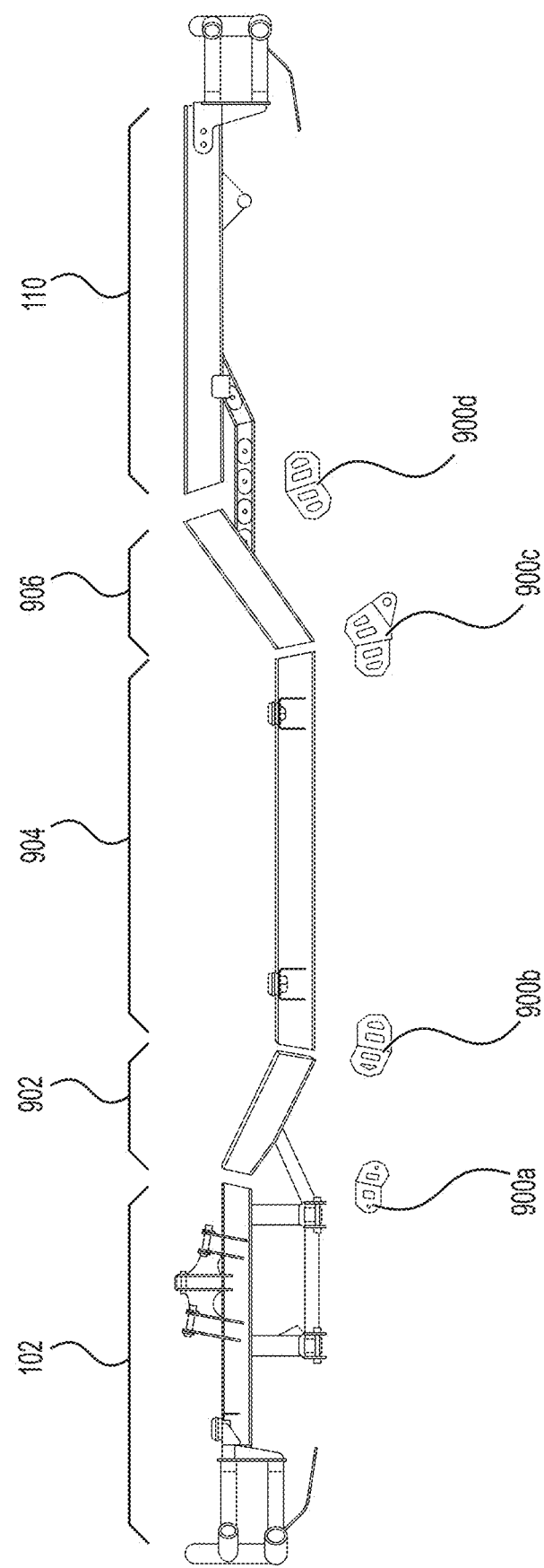
FIG. 10 is a side view of the vehicle chassis of FIG. 9 showing the chassis portions disconnected at the mating brackets.

Now turning to FIG. 9, a side view depicts 5 portions as part of the overall modular chassis. Specifically, the front portion 102 and the rear portion 110, along with a selected front transition portion 902, a selected center portion 904, and a selected rear transition portion 906. The selected portions may be from FIG. 1 or 3 above or may be additional portions that further allow for more sizing and modularity of the overall chassis. Here, a first mating bracket 900a connects the front portion 102 to the front transition portion 902. This first mating bracket has a downward angled end to create the connection between the two portions. A second mating bracket 900b connects the front transition portion 902 to the center portion 904. Again, this bracket 900b has an appropriate angle and bend to create the necessary connection. Third and fourth mating brackets 900c-d connect the center portion 904 to the rear transition portion 906 and the rear transition portion 906 to the rear portion 110 respectively. In some embodiments, these mating brackets are the sole connecting structural component between the portions, which allows for easy disassembly and reconnection between the portions. In FIG. 10, a side view accordingly depicts the portions disconnected for clarity. As would be understood by those skilled in the art, corresponding mating brackets connect the opposing side of the portions together.

As also shown in FIG. 9, in some embodiments, the chassis has varying heights. Specifically, in at least some embodiments, the center portion 904 is at a first vertical position, the front portion 102 is at a second vertical position, and the rear portion 110 is at a third vertical position, the second vertical position being higher than the first vertical position, and the third vertical position being higher than the first and second vertical positions.

Figure 11:
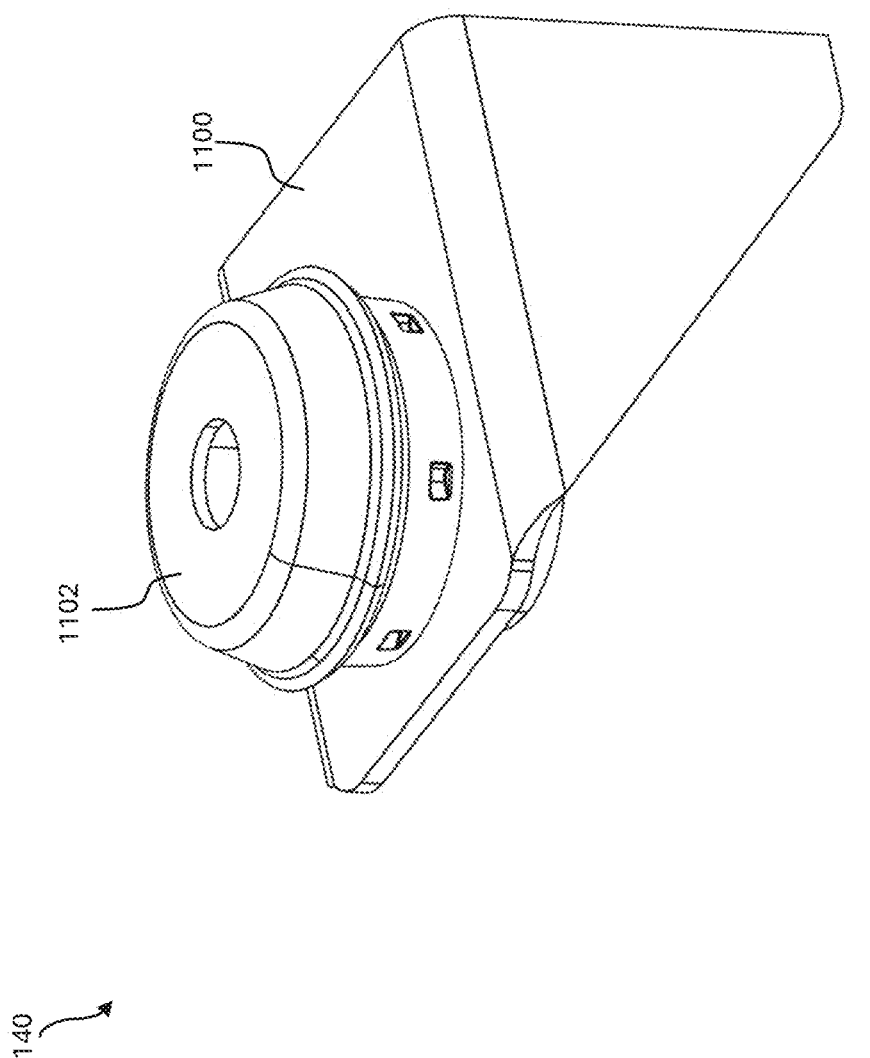
FIG. 11 is a perspective view of a mounting fixture as part of the vehicle having an interchangeable power supply.

In FIG. 11, one embodiment of a mounting fixture 140 is shown. Here, a base mounting plate 1100 is used to attach a fitting 1102 to an associated portion of the chassis. The base mounting plate 1100 may extend out perpendicular to a side surface of the chassis (e.g. FIG. 1), or alternatively may be mounted to a top surface of the chassis (e.g. FIG. 3). In some embodiments, the fitting 1102 is specifically a press-fit fitting or may be another type of fitting now known or later developed for such a purpose. The base mounting plate 1100 may be substantially U-shaped, and the fitting 1102 is configured to receive and secure an exterior body panel. One of skill in the art will appreciate that the number of body mounting fixtures, as well as the exact location and distribution of said fixtures, may vary depending on the size and specific geometry of the chassis and/or the body panels themselves, without departing from the scope of the invention.

Figure 12:
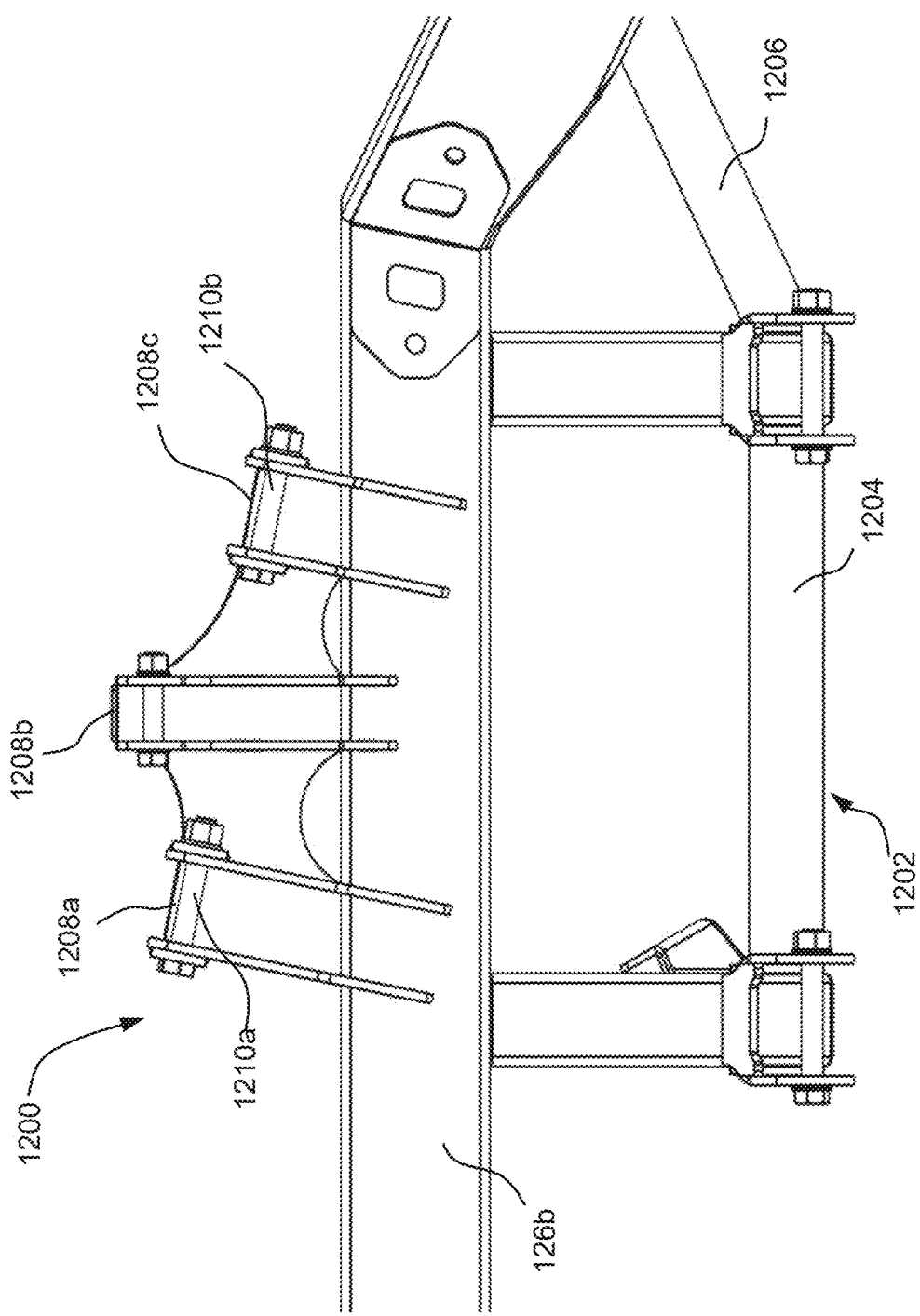
FIG. 12 is a side view of a front suspension mounting assembly as part of the vehicle having an interchangeable power supply.
Figure 13:
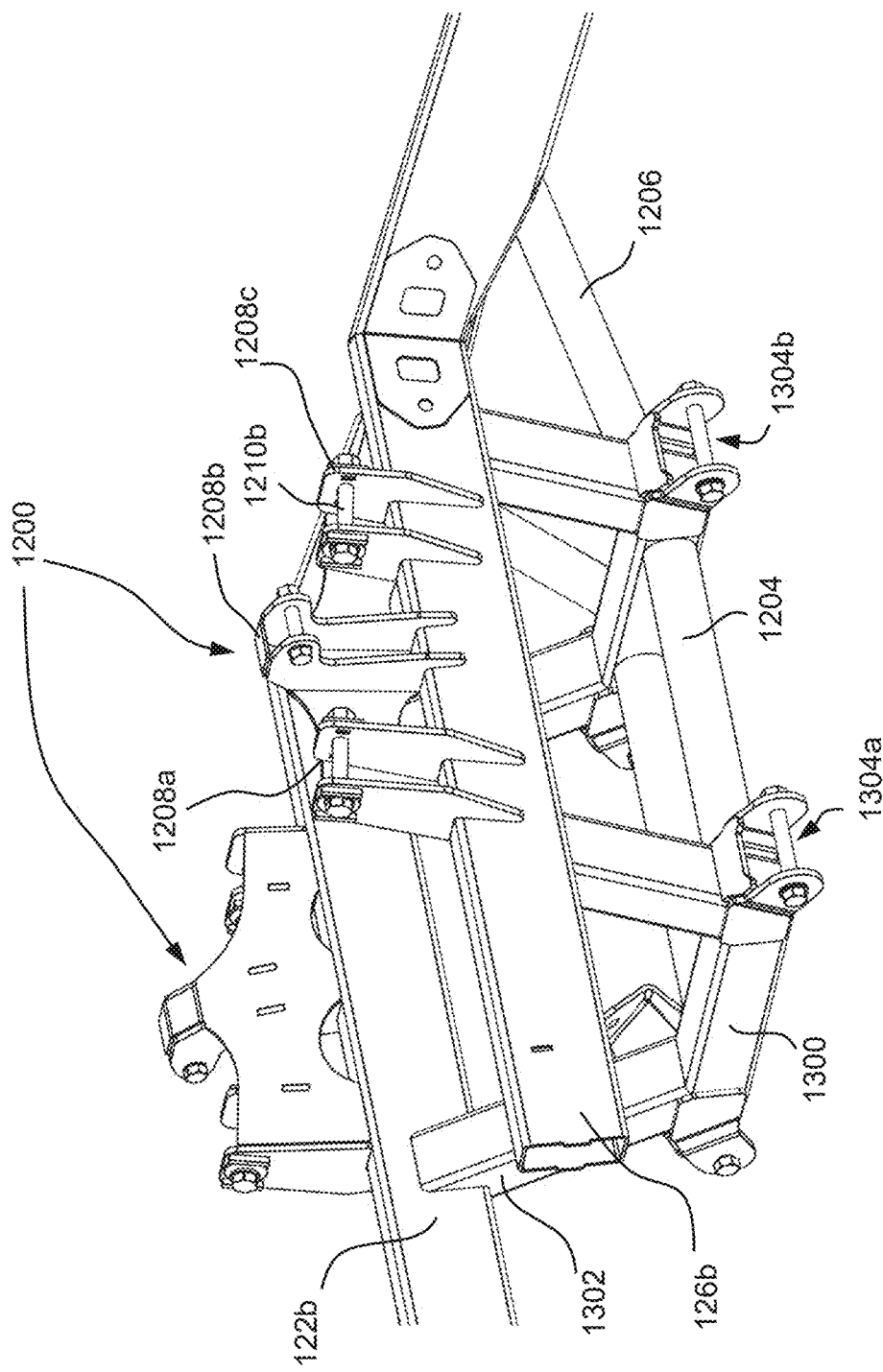
FIG. 13 is a perspective view of the front suspension mounting assembly of FIG. 12.
Figure 14:
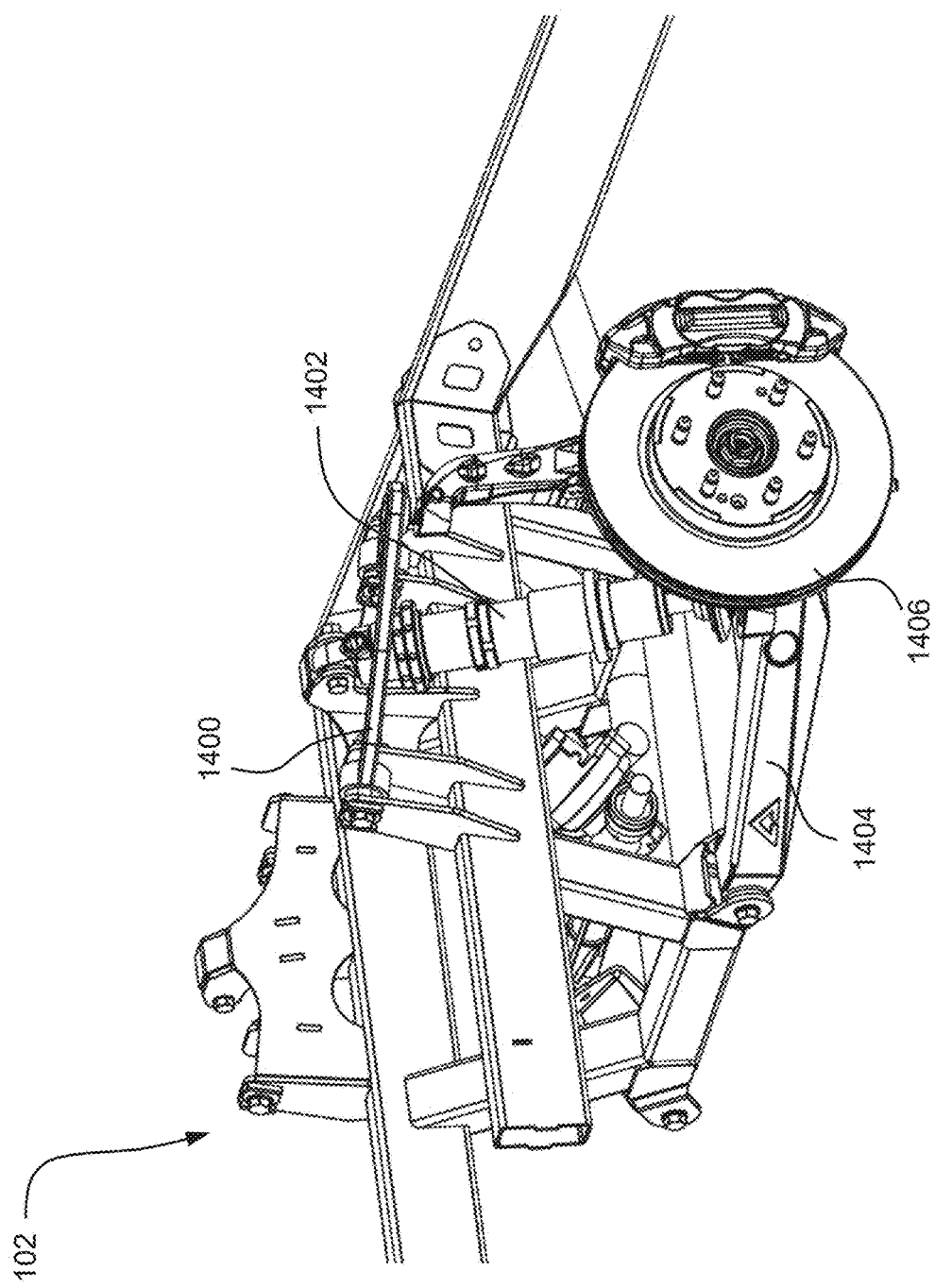
FIG. 14 is another perspective view of the front suspension mounting assembly of FIG. 12 showing a connection to a brake assembly.

In FIGS. 12 through 14, a front suspension mounting assembly 1200 as part of the front portion 102 is shown. The front suspension mounting assembly 1200 includes lower parallel longitudinal supports 1204 and angular offset supports 1206, the lower parallel longitudinal supports 1204 are dropped to a lower vertical position via angular supports 1302. The assembly 1200 further includes a plurality of front suspension mounting brackets 1208a-c which are configured to hold various elements to the front suspension assembly 1200. The front suspension mounting brackets 1208a-c are generally affixed to and project upward from a front portion longitudinal support 126b. The front suspension mounting brackets 1208a-c may be substantially vertical, or may be angularly offset from the vertical as shown in the illustrated embodiment. Front suspension mounting brackets 1208a and 1208c are generally configured to secure an upper control arm 1400 of the front suspension (as shown in FIG. 14), and as such the upper control arm mounting pins (which may be in the form of bolts or similar mechanical fasteners as illustrated) 1210a-1210b are preferably substantially coaxial. The central bracket 1208b is configured to secure an end of a shock absorber 1402. The central bracket 1208b may be substantially parallel to the upper control arm mounting brackets 1208a, 1208c, or may be offset as shown in the illustrated embodiment.

In addition to the upper control arm 1400 and shock absorber 1402, the front suspension assembly 1200 further includes a lower control arm 1404 and a front disc brake assembly 1406. The lower control arm 1404, best shown in FIG. 14, may be generally describes as being wishbone- or delta-shaped in nature. The lower control arm 1404 is securable to the chassis by a pair of lower control arm mounts 1304a-b disposed on the front suspension mounting frame 1202 which slidingly engage with a proximal end of the lower control arm 1404, and the lower control arm 1404 is attachable to the brake assembly 1406 at a distal end. The lower control arm 1404 also includes a mount 1304b for a second end of the shock absorber 1402, which may be in the form of a spherical rod end bearing or similar pivotable mount. The front suspension and brake assembly 1406 allow for selective attachment of a suitable wheel to allow the vehicle to move as desired by the user.

In FIG. 15, a flowchart 1500 summarizes the method of interchanging a vehicle power supply as part of the present invention.

At step 1502, the vehicle is first assembled having a first chassis and a first power supply compartment, wherein the first power supply compartment 138 is determined based on selected portions of the first chassis. Using the chassis 100, 300 discussed above, either the first center portion 106 or the second center portion 304 may be initially selected. The selected center portion will further define the power supply compartment, and associated front and rear transitional portions are also selected to correspond to the center portion.

At step 1504, if desired, the vehicle is disassembled. Disassembly will include removing vehicle body components from the plurality of mounting fixtures to expose the first chassis and the first power supply.

At step 1506, the first power supply is removed from the first center portion of the first chassis.

At step 1508, the first chassis is disassembled by disconnecting the portions making up the first chassis. Specifically, the front portion is disconnected from the first front transition portion by disconnecting a first set of mating brackets connecting the two portions together. The first center section is disconnected from the first front transition portion and the first rear transition section via second and third sets of mating brackets. And the rear portion is disconnected from the first rear transition section via a fourth set of mating brackets.

At step 1510, a second center portion is selected based on a new power supply. For example, a larger center portion is selected to increase the size of a power supply that can be added to the chassis. Then a second chassis is assembled with the new center portion. Selecting a new center portion also requires selecting corresponding front and rear transition portions. The second chassis is assembled with the front portion now connected to a second front transition portion, the second center portion connected to the second front transition portion and the second rear transition portion, and the rear portion is connected to the second rear transition portion.

At step 1512, the vehicle is reassembled by adding the second power supply to the second center portion and reattaching vehicle body components to fittings of the second chassis.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of interchanging power supplies associated with a vehicle, the method comprising:
    assembling a first chassis, the first chassis having:
        a front portion, a rear portion, a first center portion, a first front transition portion disposed between the front portion and the first center portion, and a first rear transition portion disposed between the first center portion and the rear portion;
        the first center portion having a pair of longitudinal supports extending between the first front transition portion and the first rear transition portion, the first center portion forms a first power supply compartment having a first dimensional width between the pair of longitudinal supports sized for a first power supply;
        a first plurality of mounting fixtures supported by one or more of the front portion, the first front transition portion, the first center portion, the first rear transition portion, and the rear portion; and
        a first cross member extending between a pair of rear longitudinal supports, a second cross member extending between a first side of the first rear transition portion and a second side of the first rear transition portion, and one or more downwardly-angled supports extending between the first cross member and the second cross member;
    assembling the vehicle with the first chassis, wherein assembling the vehicle includes:
        securing the first power supply to the first center portion; and
        securing a plurality of vehicle body components to the first plurality of mounting fixtures;
    interchanging the first power supply with a second power supply, wherein interchanging the first power supply with the second power supply includes:
        disassembling the vehicle by removing the plurality of vehicle body components from the plurality of mounting fixtures to expose the first chassis and the first power supply, removing the first power supply, disconnecting the front portion from the first front transition portion, disconnecting the first center portion from the first front transition portion and the first rear transition portion, and disconnecting the rear portion from the first rear transition portion;
        selecting a second center portion appropriate for the second power supply, a second front transition portion associated with the second center portion, and a second rear transition portion associated with the second center portion;
        assembling a second chassis by connecting the front portion to the second front transition portion, connecting the second center portion to the second front transition portion and the second rear transition portion, and connecting the rear portion to the second rear transition portion; and
        installing the second power supply onto the second center portion;
        wherein the second center portion has a second dimensional width that is different from the first dimensional width such that the first center portion and the second center portion support different power supplies;
    reassembling the vehicle by installing the plurality of vehicle body components onto a second plurality of mounting fixtures of the second chassis.

2. The method of claim 1, wherein the first chassis further comprises the front portion having a pair of longitudinal supports extending from a front end of the first chassis to the first front transition portion.

3. The method of claim 1, wherein disassembling the vehicle further comprises:
    disconnecting the front portion from the first front transition portion by disconnecting a first set of mating brackets that extends between the front portion and the first front transition portion;
    disconnecting the first center portion from the first front transition portion and the first rear transition portion by disconnecting a second set of mating brackets that extends between the first center portion and the first front transition portion and by disconnecting a third set of mating brackets that extends between the first center portion and the first rear transition portion; and
    disconnecting the rear portion from the first rear transition portion by disconnecting a fourth set of mating brackets that extends between the rear portion and the first rear transition portion;
    wherein the first, second, third, and fourth sets of mating brackets are the only structural components holding associated portions together.

4. The method of claim 1, wherein assembling the first chassis further comprises:
    positioning the first center portion at a first vertical position, the front portion at a second vertical position, and the rear portion at a third vertical position, the second vertical position being higher than the first vertical position, and the third vertical position being higher than the first and second vertical positions.

5. The method of claim 1, wherein the first chassis further comprises:
a front suspension mounting assembly positioned between a pair of longitudinal supports as part of the front portion, the front suspension mounting assembly having:
a suspension mounting frame secured to the pair of longitudinal supports via a plurality of angular supports, the plurality of angular supports extending the suspension mounting frame to a position below the pair of longitudinal supports, the suspension mounting frame being substantially rectangular;
a plurality of mounts extending outwardly from the suspension mounting frame, the plurality of mounts configured to engage with one or more control arms for supporting one or more brake assemblies.

6. The method of claim 1, wherein the first plurality of mounting fixtures further comprises at least one mounting fixture extending from an exterior surface of the first center portion, the at least one mounting fixture includes a base mounting plate that extends substantially perpendicular from the exterior surface and a fitting that extends upward from the base mounting plate.

7. The method of claim 6, wherein the at least one mounting fixture is a press-fit style fitting.

8. The method of claim 1, wherein the second plurality of mounting fixtures further comprises at least one mounting fixture extending from a top surface of the second center portion, the at least one mounting fixture having a base mounting plate positioned on the top surface and a fitting that extends upward from the base mounting plate.

9. The method of claim 8, wherein the at least one mounting fixture is a press-fit style fitting.

10. The method of claim 1, wherein:
the first plurality of mounting fixtures further comprises a first mounting fixture attached to a first longitudinal support of the first center portion and a second mounting fixture attached to a second longitudinal support of the first center portion; and
the second plurality of mounting fixtures further comprises a third mounting fixture attached to a first longitudinal support of the second center portion and a fourth mounting fixture attached to a second longitudinal support of the second center portion;
wherein a distance between the first mounting fixture and the second mounting fixture is equal to a distance between the third mounting fixture and the fourth mounting fixture such that a single vehicle component can attach to either the first and second mounting fixtures or the third and fourth mounting fixtures without any alterations to the vehicle component.

11. A system for interchanging power supplies associated with a vehicle, the system comprising:
a first chassis, the first chassis having:
a front portion, a rear portion, a first center portion, a first front transition portion disposed between the front portion and the first center portion, and a first rear transition portion disposed between the first center portion and the rear portion;
the first center portion having a pair of longitudinal supports extending between the first front transition portion and the first rear transition portion, the first center portion forms a first power supply compartment having a first dimensional width between the pair of longitudinal supports sized for a first power supply; and
a first plurality of mounting fixtures supported by one or more of the front portion, the first front transition portion, the first center portion, the first rear transition portion, and the rear portion, the first plurality of mounting fixtures configured to receive a plurality of vehicle body components to render the vehicle;
wherein the front portion can disconnect from the first front transition portion via a first set of mating brackets, the first center portion can disconnect from the first front transition portion via a second set of mating brackets and from the first rear transition portion via a third set of mating brackets, and the rear portion can disconnect from the first rear transition portion via a fourth set of mating brackets;
the first power supply configured to removably secure within the first power supply compartment;
a second center portion having a second power supply compartment with a second dimensional width appropriate for a second power supply and a second plurality of mounting fixtures;
a second front transition portion associated with the second center portion;
a second rear transition portion associated with the second center portion;
a second chassis having the front portion connected to the second front transition portion, the second center portion connected to the second front transition portion and the second rear transition portion, and the rear portion connected to the second rear transition portion;
the second power supply configured to removably secure within the second power supply compartment;
wherein the first plurality of mounting fixtures further comprises a first mounting fixture attached to a first longitudinal support of the first center portion and a second mounting fixture attached to a second longitudinal support of the first center portion; the second plurality of mounting fixtures further comprises a third mounting fixture attached to a first longitudinal support of the second center portion and a fourth mounting fixture attached to a second longitudinal support of the second center portion; and wherein a distance between the first mounting fixture and the second mounting fixture is equal to a distance between the third mounting fixture and the fourth mounting fixture such that a single vehicle component can attach to either the first and second mounting fixtures or the third and fourth mounting fixtures without any alterations to the vehicle component;
wherein the first center portion can be interchanged with the second center portion such that the first power supply can be interchanged with the second power supply; and
wherein the second center portion has a second dimensional width that is different from the first dimensional width such that the first center portion and the second center portion support different power supplies.

12. The system of claim 11, wherein the first center portion is positioned at a first vertical position, the front portion is positioned at a second vertical position, and the rear portion is positioned at a third vertical position, the second vertical position being higher than the first vertical position, and the third vertical position being higher than the first and second vertical positions.

13. The system of claim 11, wherein the first chassis further comprises:
  a front suspension mounting assembly positioned between a pair of longitudinal supports as part of the front portion, the front suspension mounting assembly having:
    a suspension mounting frame secured to the pair of longitudinal supports via a plurality of angular supports, the plurality of angular supports extending the suspension mounting frame to a position below the pair of longitudinal supports, the suspension mounting frame being substantially rectangular;
    a plurality of mounts extending outwardly from the suspension mounting frame, the plurality of mounts configured to engage with one or more control arms for supporting one or more brake assemblies.

14. The system of claim 11, wherein the first chassis further comprises a first cross member extending between a pair of rear longitudinal supports, a second cross member extending between a first side of the first rear transition portion and a second side of the first rear transition portion, and one or more downwardly-angled supports extending between the first cross member and the second cross member.

15. The system of claim 11, wherein the second plurality of mounting fixtures further comprises at least one mounting fixture extending from a top surface of the second center portion, the at least one mounting fixture having a base mounting plate positioned on the top surface and a fitting that extends upward from the base mounting plate.

16. The system of claim 15, wherein the at least one mounting fixture is a press-fit style fitting.

17. The system of claim 11, wherein the first plurality of mounting fixtures further comprises at least one mounting fixture extending from an exterior surface of the first center portion, the at least one mounting fixture includes a base mounting plate that extends substantially perpendicular from the exterior surface and a fitting that extends upward from the base mounting plate.

18. The system of claim 17, wherein the at least one mounting fixture is a press-fit style fitting.

* * * * *